(12) United States Patent
Kinoshita (10) Patent No.: US 7,091,651 B2
(45) Date of Patent: Aug. 15, 2006

(54) PIEZOELECTRIC DEVICE AND METHOD OF MANUFACTURE OF A PIEZOELECTRIC DEVICE

(75) Inventor: Yusuke Kinoshita, Minowa-machi (JP)

(73) Assignee: Seiko Epson Corporation, (JP)

( * ) Notice: Subject to any disclaimer, the term of this patent is extended or adjusted under 35 U.S.C. 154(b) by 0 days.

(21) Appl. No.: 10/873,034

(22) Filed: Jun. 21, 2004

(65) Prior Publication Data

US 2005/0040734 A1 Feb. 24, 2005

(30) Foreign Application Priority Data

Jun. 19, 2003 (JP) .............................. 2003-175020

(51) Int. Cl.
*H01L 41/047* (2006.01)
*H01L 41/053* (2006.01)
(52) U.S. Cl. ...................................... 310/365; 310/348
(58) Field of Classification Search ................ 310/365, 310/348
See application file for complete search history.

(56) References Cited

U.S. PATENT DOCUMENTS

| | | | |
|---|---|---|---|
| 6,396,200 B1* | 5/2002 | Misu et al. ................. | 310/348 |
| 6,534,900 B1* | 3/2003 | Aigner et al. ............... | 310/326 |
| 2002/0166380 A1 | 11/2002 | Koike | |
| 2004/0135474 A1* | 7/2004 | Koyama et al. ............ | 310/348 |
| 2004/0155560 A1* | 8/2004 | Koike et al. ................ | 310/348 |
| 2004/0160145 A1* | 8/2004 | Takeuchi et al. ........... | 310/348 |

FOREIGN PATENT DOCUMENTS

| | | | |
|---|---|---|---|
| DE | 198 00 33 A1 | | 1/1998 |
| EP | 0 553 718 A1 | | 1/1993 |
| JP | 59023613 A | * | 2/1984 |
| JP | 07176971 A | * | 7/1995 |
| JP | 2001091259 | | 4/2001 |
| JP | 2001304870 | | 10/2001 |
| JP | 2003156511 | | 5/2003 |
| JP | 2003-294450 | | 10/2003 |

OTHER PUBLICATIONS

EPO form 1507.0 European Search Report with references cited above.

* cited by examiner

*Primary Examiner*—Karl Tamai
(74) *Attorney, Agent, or Firm*—Anderson Kill & Olick, PC

(57) ABSTRACT

A piezoelectric device including a piezoelectric resonator element; lead wire(s) having first and second ends with the first end connected to the piezoelectric resonator element for holding the piezoelectric resonator element spaced from the base of a package and having a support substrate for supporting the lead wire, with the lead wire being affixed to an undersurface of the support substrate at or near the second end of the lead wire(s) facing the base of the package and with the undersurface being in an obverse and reverse relationship to an opposite surface facing the resonator element.

12 Claims, 8 Drawing Sheets

PIEZOELECTRIC DEVICE AND METHOD OF MANUFACTURE OF A PIEZOELECTRIC DEVICE

FIELD OF THE INVENTION

This invention relates to a piezoelectric device using a resonator element composed of, for example, quartz, and to a method of manufacturing a piezoelectric device.

DESCRIPTION OF THE RELATED ART

Figure 11:
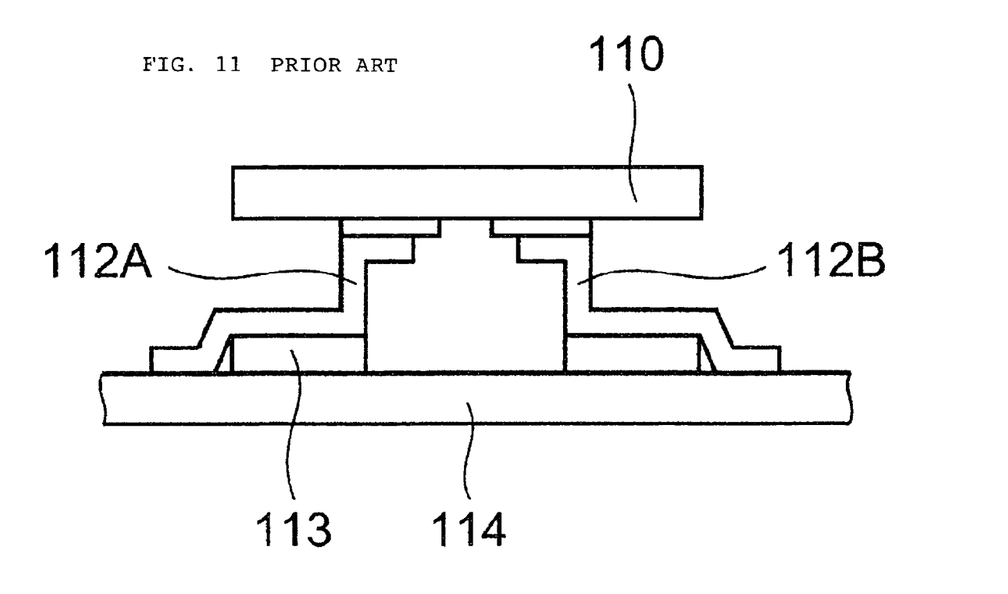
FIG. 11 is a diagram showing a configuration of a conventional piezoelectric device.

A conventional piezoelectric device is shown in FIG. 11 mounted on a package 114 which is a base substrate member, and includes lead wires 112A and 112B which are affixed to a support substrate 113, and a piezoelectric resonator element 110. The piezoelectric resonator element 110 is supported by one end of the lead wires 112A and 112B on the package 114 via the support substrate 113.

The support substrate 113 is configured such that the lead wires 112A and 112B are affixed to the upper surface of the support substrate 113 which is in an obverse and reverse relationship to the surface thereof in contact with the package 114.

In the above-mentioned configuration, the lead wires are bent into a shape to allow for an amount of thickness for the support substrate 113 corresponding to the space present in between the lead wires and the package (hereinafter referred to as "lead forming") in order to secure close adhesion with the package at the junction thereto.

In this configuration the upper surface of the lead wires are exposed to the deposition of gold particles or to a "splash of deposited gold particles" (hereinafter referred to as "Au splash"), which are generated when tuning the resonator element to a desired vibration frequency. This can result in causing a short circuit between the lead wires.

It is desirable to enable the lead wires to adhere closely to the base substrate without lead forming. In accordance with the present invention this is accomplished by affixing the lead wires to the lower or undersurface of the support substrate facing the package. Moreover, by provided an upper surface of the support substrate for receiving the Au splash Au splash is prevented from causing a short circuit between the lead wires.

The piezoelectric device of this invention comprises a resonator element, a lead wire having one end thereof in contact with the piezoelectric resonator element for holding the piezoelectric resonator element spaced from the base of a package and having a support substrate for supporting the lead wire, and with the opposite end of said lead wire affixed to a surface of said support surface which is in an obverse and reverse relationship to the surface thereof facing the resonator element.

In accordance with this invention the lead wire is affixed to a lower or undersurface of the support substrate facing the base substrate of the package, so that the lead wire will adhere closely to the base substrate of the package thereby dispensing with the lead forming processing as is now conventionally practiced.

The arrangement of the present invention prevents Au splash on the upper surface of the lead wire and, in turn, prevents a short circuit from occurring between the lead wires.

Further, the lead wire may be shaped so that the piezoelectric resonator element is connected to a rise-up section thereof extending from the periphery of the support substrate.

Such an arrangement makes it possible to adjust the rigidity of the lead wire within a limited space, thus preventing any defect such as breakage of the piezoelectric resonator element.

Still further, the support substrate and the piezoelectric resonator element may be disposed with a gap therebetween which makes it possible to hold the piezoelectric resonator element in midair without contacting other component parts, thus enabling stable vibration to continue without impeding vibration of the piezoelectric resonator element.

Accordingly, the piezoelectric device of this invention comprises a piezoelectric resonator element, lead wire(s) having first and second ends with the first end connected to the piezoelectric resonator element for holding the piezoelectric resonator element spaced from the base of a package and having a support substrate for supporting the lead wire on the base of the package, with the lead wire being affixed at or near the second end thereof to the support substrate on a lower or undersurface of the support substrate facing the base of the package.

The support substrate may be configured to include an open window section at a location at which the lead wire is affixed thereto.

Such an arrangement enables a junction tool to directly contact the lead wire without using the support substrate, thereby making it possible to reduce junction defects.

Moreover, the support substrate may have an opening part along the center of the support substrate towards the periphery for contact with the lead wire at a rise up section thereof or at a trailing section thereof preferably at an area of the support substrate in the thickness direction corresponding to the opening part.

An arrangement in this manner enables a tool for forming the rise-up section or the trailing section of the lead wire to pass through the opening part of the support substrate, for example, a forming die and the like to be inserted to form the rise-up section or the trailing section of the lead wire, thereby making it possible to simplify lead wire processing.

Further, it may be adapted such that the support substrate is formed of a conductive thin plate and an insulating layer, the lead wire being supported by a surface of the insulating layer.

An arrangement in this manner enables a more stable vibration signal to be obtained due to a shield effect of the conductive thin plate.

The resonator element in the piezoelectric device is a resonator element for a gyro sensor for detecting rotary angular velocity.

The method of manufacturing a piezoelectric device which includes a resonator element, a lead wire having opposite ends and a support substrate supporting the lead wire comprising the steps of: a first step of connecting the resonator element to one end of the lead wire, and a second step of joining the other end of the lead wire to the substrate through an open window section of the support substrate.

An arrangement in this manner enables a joining member to be supplied directly to the lead wire when joining the lead wire to the substrate, so that joint stability may be improved and to reduce joint defects.

The piezoelectric device may be mounted upon electronic equipment according to this invention for preventing defects from occurring.

BRIEF DESCRIPTION OF THE DRAWINGS

Further advantages will become apparent from the detailed description of the invention when read in conjunction with the accompanying drawings of which.

DETAILED DESCRIPTION OF THE PREFERRED EMBODIMENTS OF THE INVENTION

In the embodiment of FIG. 1, a gyro sensor using a quartz resonator element will be hereafter described as an example of a piezoelectric device.

Figure 1A:
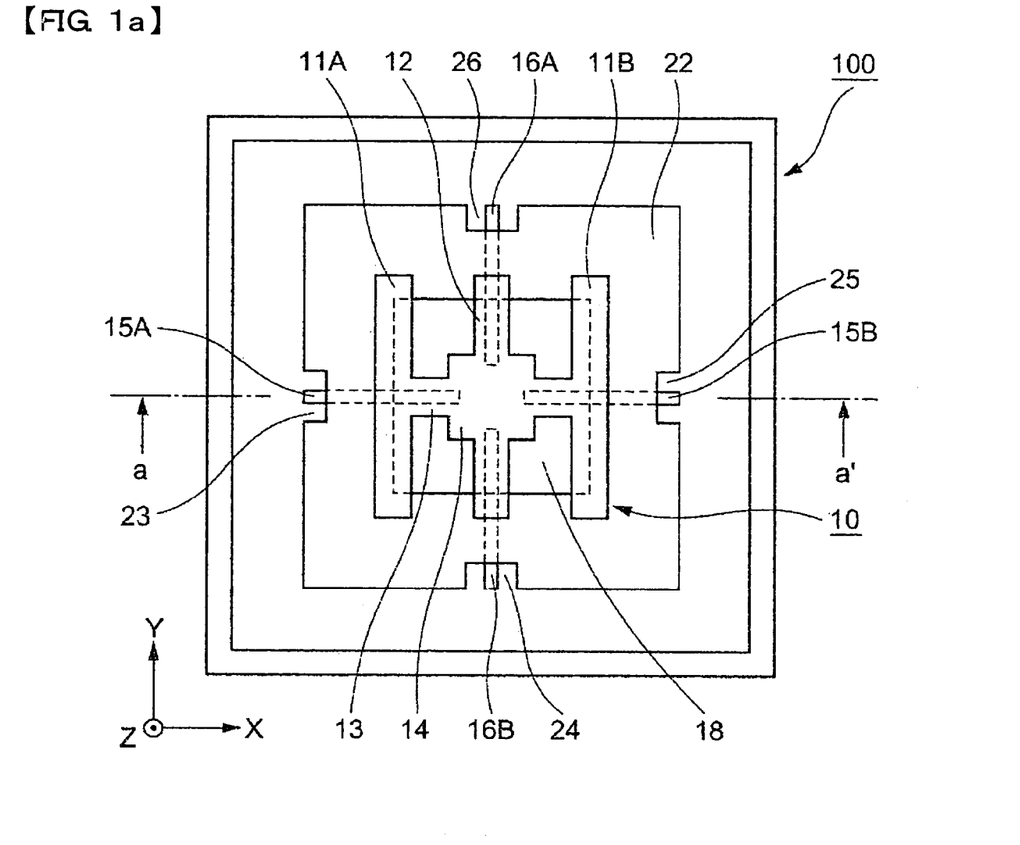
FIG. 1(a) is a plan view, of a piezoelectric device in accordance with the present invention for use as a gyro vibrating sensor.
Figure 1B:
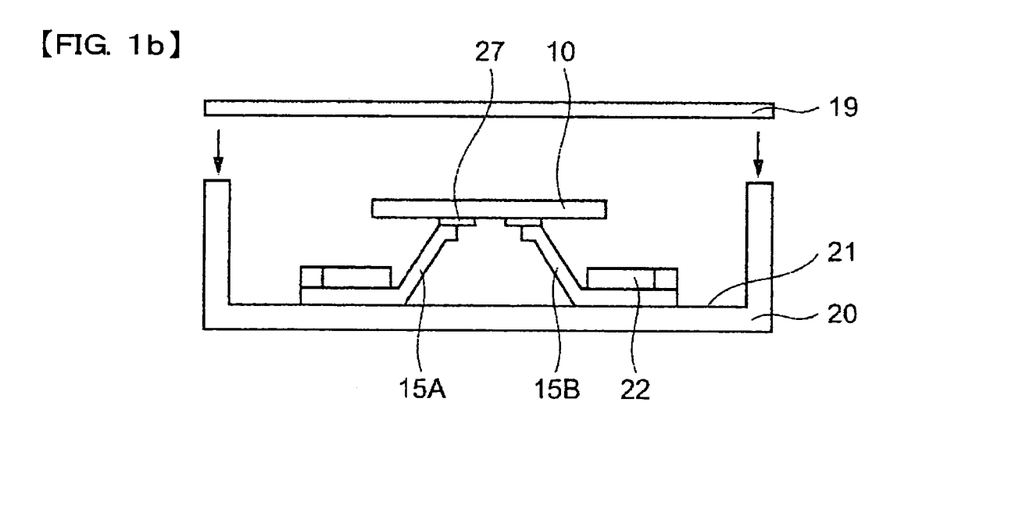
FIG. 1(b) is a front view of FIG. 1(a) taken along the lines a–a'.

According to FIG. 1(a) and FIG. 1(b), to detect the posture and a position of an object such as electronic equipment and/or a vehicle, a gyro sensor 100 is mounted on the electronic equipment with the gyro sensor 100 comprising a gyro resonator element 10, which is a piezoelectric resonator element; lead wires 15A, 15B, 16A and 16B which function as a support mechanism to support the gyro resonator element 10 upon a package 20 made of e.g., ceramic; a support substrate 22 to support, the lead wires 15A and the like and a cover 19 for the package 20.

Resonator Element Configuration

To operate the gyro-sensor 100 in three modes hitherto known as the drive mode, detection mode, and spurious mode, respectively, the gyro resonator element 10 in the gyro sensor 100 includes a first drive arm 11A and a second drive arm 11B which constitute a drive unit, a detection arm 12 which constitutes a detection unit, and support parts including an arm support part 13, and a support plate 14.

As shown in FIG. 1(A), the first and second drive arm 11A and 11B of the drive unit have a rectangular plate shape of a prescribed length. The drive arms extend in the illustrated Y direction, and are aligned in parallel. Upon rotation of the gyro-sensor 100 the first and second drive arm 11A and 11B vibrate along the illustrated X direction, causing a Coriolis force which corresponds to a magnitude of the rotary angular velocity of the gyro-sensor 100 rotating about an axis in an illustrated Z direction, which is one variation of the posture of an object (not shown).

Figure 2A:
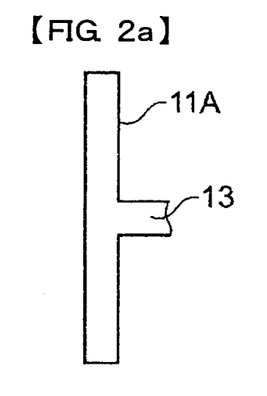
FIG. 2 is a diagram showing a motion of a drive arm in the piezoelectric device of FIG. 1(a)
Figure 2B:
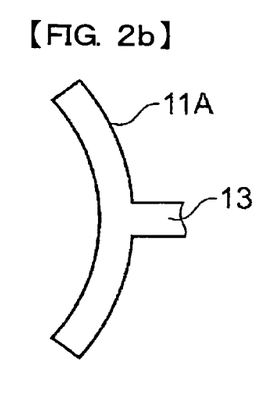
Figure 2C:
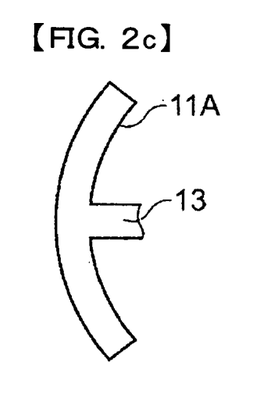

The drive arm 11A, as shown in FIG. 2(A)-(C), vibrates according to a bending motion about its center as a shaft; to be more specific, vibrating as a result of deforming in a convex and concave manner which is that the closer a member to its end, the larger it displaces along the X direction. The drive arm 11B vibrates according to a bending motion in a shape which is in a linear symmetrical relationship with the concave and convex shape to which the drive arm 11A deforms.

Figure 3:
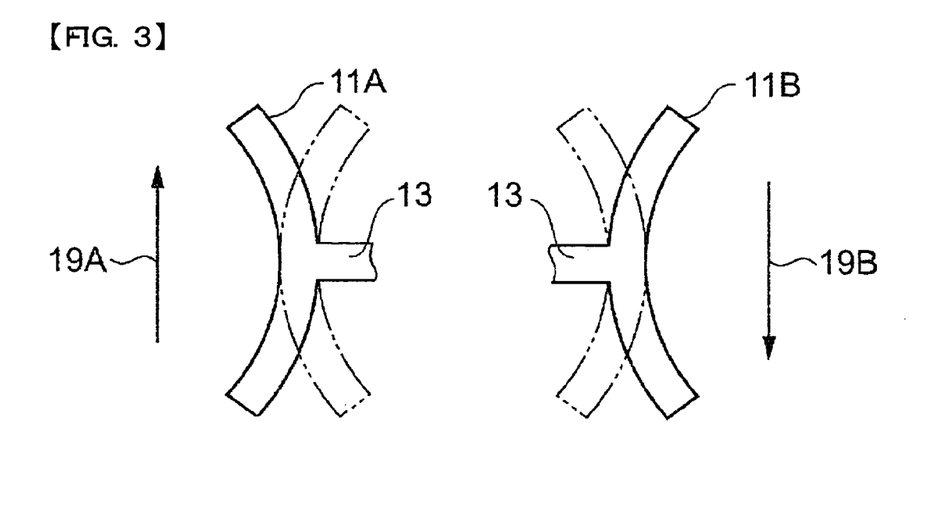
FIG. 3 is a diagram showing the relationship between the motion of the drive arm and the applied Coriolis force upon rotation of piezoelectric device.

As shown in FIG. 3, the first drive arm 11A has changed from a shape shown in dotted lines to a shape shown in solid lines, and when the second drive arm 11B changes from the shape shown in dotted lines to the shape shown in solid lines, based upon a rotation of the gyro-sensor 100 in a clockwise direction relative to an axis in the paper generating the Coriolis force in a direction opposite to arrows 19A and 19B in FIG. 3.

The detection arm 12 has a plate like shape corresponding to the shape of the first drive arm 11A and the second drive arm 11B, and is of a prescribed length extending along the illustrated Y direction. The first drive arm 11A, the second drive arm 11B, and the detection arm 12 are mutually parallel. The detection arm 12 vibrates in responds to the magnitude Coriolis force as applied to the first and the second drive arm 11A and 11B through the arm support 13.

Figure 4A:
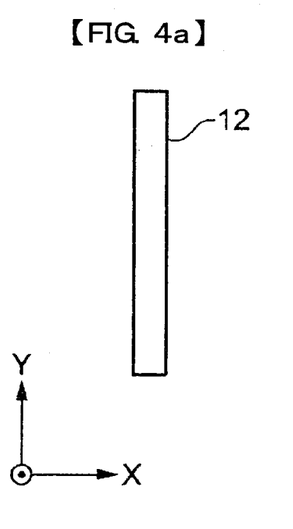
FIG. 4 is a diagram showing a motion of a detection arm.
Figure 4B:
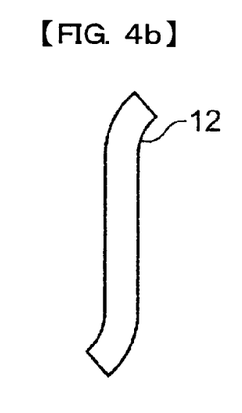
Figure 4C:
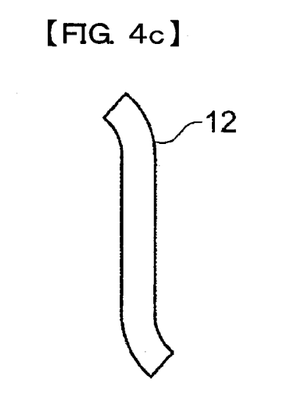

The detection arm 12, as shown in FIG. 4(a)-(c), performs a bending motion deforming from a substantially S shape into a reverse S shape, similar to the bending motion of the first and the second drive arm 11A and 11B as shown in FIG. 3(a)-3(c). By detecting an electric signal generated due to the bending motion rotation of the detection arm 12, the magnitude of the Coriolis force is known, whereby the magnitude of the rotary angular velocity applied to the object is discerned.

Returning to FIG. 1(a), one end of the arm support 13 is connected to the center of the first drive arm 11A with the opposite end connected to the center of the second drive arm 11B, and with the detection arm 12 connected such that its center matches the center of the arm support part 13. The support plate 14 is a plate shaped member having a prescribed area to which the arm support 13 and the detection arm 12 are connected.

Holding Structure of Resonator Element

The lead wires 15A and 15B extend in the X direction and the lead wires 16A and 16B extend in the Y direction which each having a narrow belt shape which are mutually identical or of different shape. Also, one end of each of the lead wires 15A, 15B, 16A and 16B is, as shown in FIG. 1(b), connected to the vicinities of corresponding sides of the support plate 14, and the other ends are connected to the package 20.

The lead wires 15A, 15B, 16A and 16B are affixed by a support substrate 22 on the package 20 and are provided in a positional relationship.

The lead wires 15A, 15B, 16A and 16B are each configured such that the gyro resonator element 10 should not touch the support substrate 22 and the package 20. To be specific, after one end of each of the lead wires 15A, 15B, 16A and 16B are connected to the package 20 they are, once bent in the direction from the periphery of the support substrate 22 towards above the center, members with the other end thereof further bent so as to be substantially parallel to the bottom surface 21 of the package 20 and the gyro resonator element 10 is connected to the other end.

Figure 5:
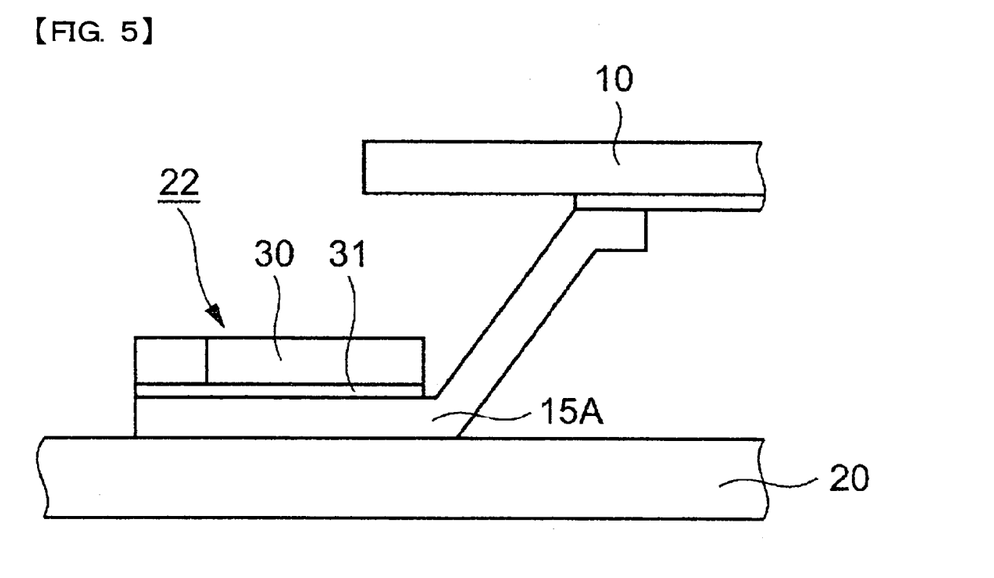
FIG. 5 is a sectional view of a structure of a support substrate 22.
Figure 8:
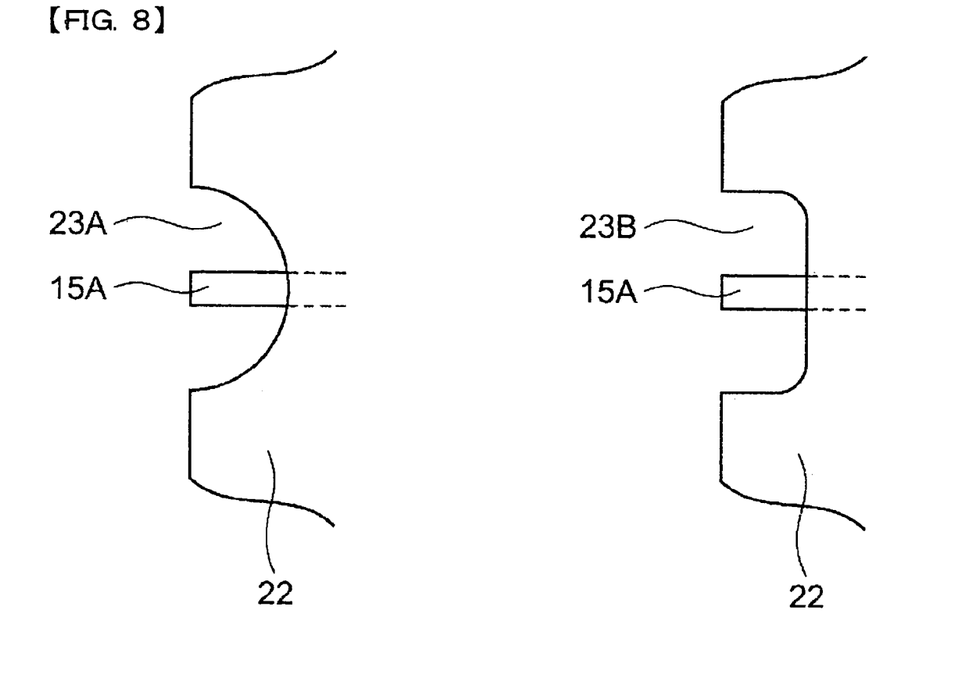
FIG. 8 is a diagrammatic illustration of different open window sections in the support substrate.

The support substrate 22, for example, as shown in FIG. 5, may be composed of: a stainless steel plate 30 on which there is provided an insulating layer 31 of a polyimide resin or the like. The lead wires 15A, 15B, 16A and 16B are affixed to the insulating layer 31, and on its center there is set up an opening part 18 for forming the lead wire 15A and the like. Further, at the support substrate 22, there are provided respective cut-out s, i.e., open window sections in the vicinities of one end of the respective lead wires The shape of the open window sections 23, 24, 25, and 26 will be described with reference to the diagrams in FIG. 8 showing application examples of different configurations for the window sections at the support substrate. As shown in FIG. 8, the window sections 23, 24, 25, and 26, may have a semicircle shape, or a shape whose corner part is a circular arc and the like, and any other shape which will not constitute a hindrance when connecting one end of the lead wire to the package 20.

According to the piezoelectric device of a first embodiment, since the lead wire 15A and the like are affixed to a lower surface of the support substrate 22, that is, a surface facing the package 20, it is possible to affix the lead wire 15A and the like to the package 20 without subjecting the lead wire 15A and the like to lead forming.

Further, by receiving the Au splash on the upper surface of the support substrate the Au splash is prevented from depositing on the lead wires, thus making it possible to prevent a short circuit between one lead wire and another.

Manufacturing Method of a Piezoelectric Vibrating Device

FIG. 7 is an example of the method of the present invention for manufacturing a gyro sensor.

In should be understood that each of the lead wires 15A, 15B, 16A and 16B are affixed to the support substrate 22 and have a prescribed shape with open window sections 23–26 respectively.

Figure 7A:
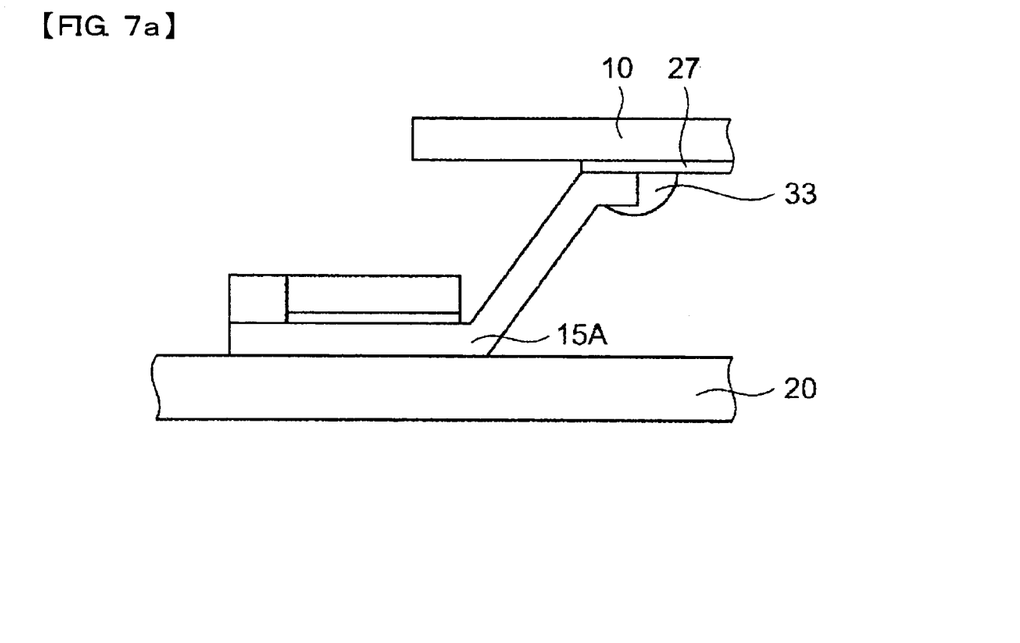
FIG. 7 is a diagrammatic illustration of the method of the present invention for connecting both ends of the lead wire.

For purposes of simplicity the lead wire 15A will hereafter be referred only using the term "and the like" following 15A to mean collectively all of the lead wires 15A, 15B, 16A and 16B One end of the lead wire 15A and the like, is affixed to the package 20, with the gyro resonator element 10 placed on the other end. After coating a conductive bond 33, the ends are dried and connected to a support electrode 27 of the gyro resonator element 10.

Figure 7B:
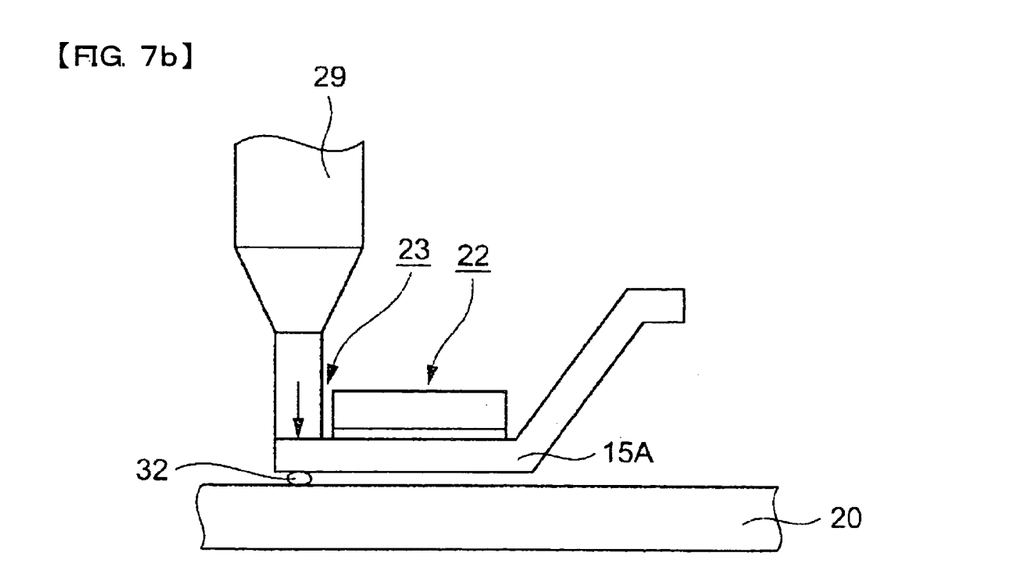

Subsequently, as shown in FIG. 7(b), the formed lead wire 15A and the like are affixed to the package 20. To be specific, for example, an Au bump 32 is placed on the package 20, and the lead wire 15A and the like are placed on the Au bump 32. At this point, the open window section 23 is provided to the above-mentioned affixed part of the support substrate 22, a heating tool 29 is inserted into the window section 23, and the lead wire 15A, the Au bump 32, and the package are affixed by applying pressure while heating them.

Now, in the above-mentioned manufacturing method of the piezoelectric vibrating device, it was described that after first connecting the gyro resonator element to the lead wires, the lead wires were affixed to the package. However, a processing sequence may very well be in reverse, so that after first connecting the lead wires to the gyro resonator element, the gyro resonator element may be affixed to the lead wires.

According to this method, since it is possible to put the heating tool in touch directly with the lead wire 15A and the like, enhancing heating efficiency Also, stable affixing work can be performed.

Second Embodiment

Figure 6A:
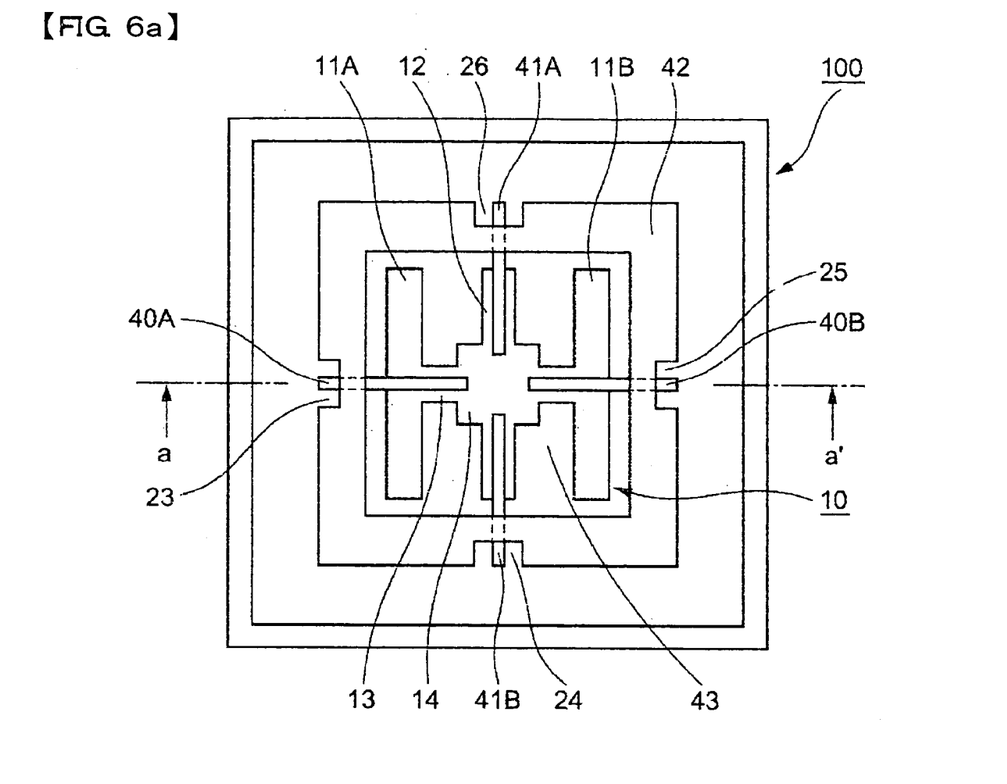
FIG. 6(a) is a plan view showing a configuration of the gyro sensor as an example of the piezoelectric device.
Figure 6B:
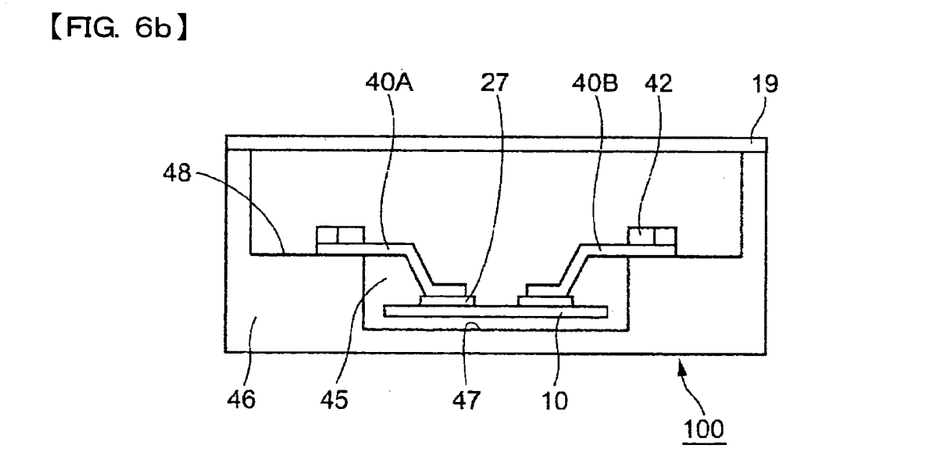
FIG. 6(b) is a front view of FIG. 6(a) taken along the lines a–a'.

A second embodiment will be described using FIG. 6(a) and FIG. 6(b). showing a configuration of a gyro sensor 100 as an example of the piezoelectric device of the present invention which the same as the "Gyro Sensor Configuration," and "Resonator element Configuration" described in the first embodiment. Accordingly a detailed description of its operation will be omitted.

Holding Structure of a Resonator Element

The lead wires 40A and 40B extending in the X direction and 41A and 41B extending in the Y direction are belt shape members having a mutually identical or different shape. Also, one ends of the lead wires 40A, 40B, 41A and 42B are, as shown in FIG. 6(B), connected to the vicinities of corresponding sides of the support plate 14, and the other ends are connected to the package 46.

The lead wires 40A, 40B, 41A and 41B are affixed by a support substrate 42 provided in positional relationship of holding the lead wire 40A and the like onto the package 46.

At this point, a shape of the lead wire 45A and the like will be described in detail. The lead wires 40A, 40B, 41A and 42B are formed such that the gyro resonator element 10 may not be in touch with the package 46 but be positioned on a concave part 45 provided on a bottom surface 48 of the package 46. To be specific, after the lead wire 40A and the like, one ends of which are connected to the package 46, are once bent from a position of an opening part 43 of the support substrate 42 in the direction from the periphery of the support substrate 42 towards below the center, members including the other ends are further bent so as to be substantially parallel to the bottom surface 47 of the concave part 45 of the package and the gyro resonator element 10 is connected to the other ends.

The support substrate 41 is, for example, a substrate which is the stainless steel plate on which there is provided an insulating layer of a polyimide resin and the like, the lead wires 40A, 40B, 41A and 42B are affixed to the above-mentioned insulating layer, and on its center there is set up the opening part 43 for forming the lead wire 40A and the like. Further, on the support substrate 42, there are provided respective window open parts 23, 24, 25, and 26 in the vicinities of one ends of respective lead wire 40A and the like.

As mentioned above, according to a piezoelectric device of a second embodiment, since the lead wire 40 and the like are affixed to a lower surface of the support substrate 42 facing the package 46, it is possible to closely adhere the lead wire 40A and the like to the package 46 without subjecting the lead wire 40A and the like to lead forming.

Figure 9:
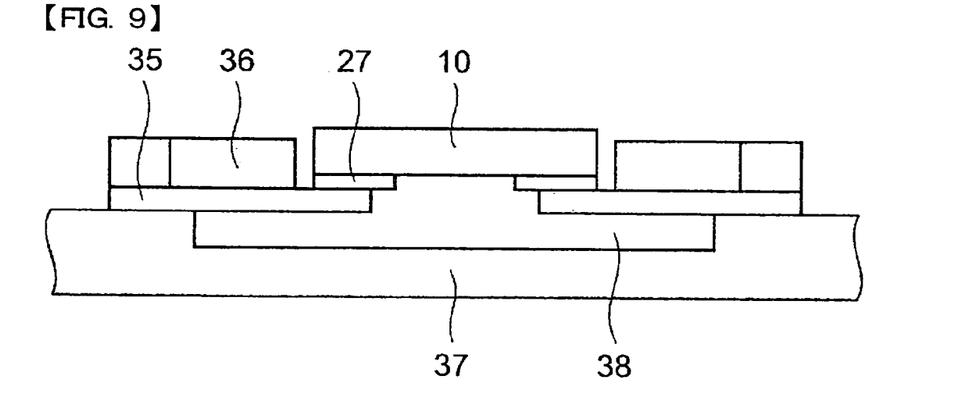
FIG. 9 is a front sectional view showing an application example of this invention.

Also, as shown in a front sectional view of FIG. 9, there may be used a configuration of a shape without bending the lead wire 35, namely, a configuration in which one end of the lead wire 35 is affixed to the undersurface of the support substrate 36 facing the package and the gyro resonator element 10 is affixed to the other end thereof which extends at a level.

According to such configuration, it is possible to adhere the lead wire 35 and the like closely to the package 37 without subjecting the lead wire 25 to lead forming at connecting sections with the package.

Also, at the connecting sections with the resonator element, too, lead forming of the lead wire 35 and the like are made unnecessary, thus making it possible to improve ease of processing lead wires.

Other Embodiments

Figure 10:
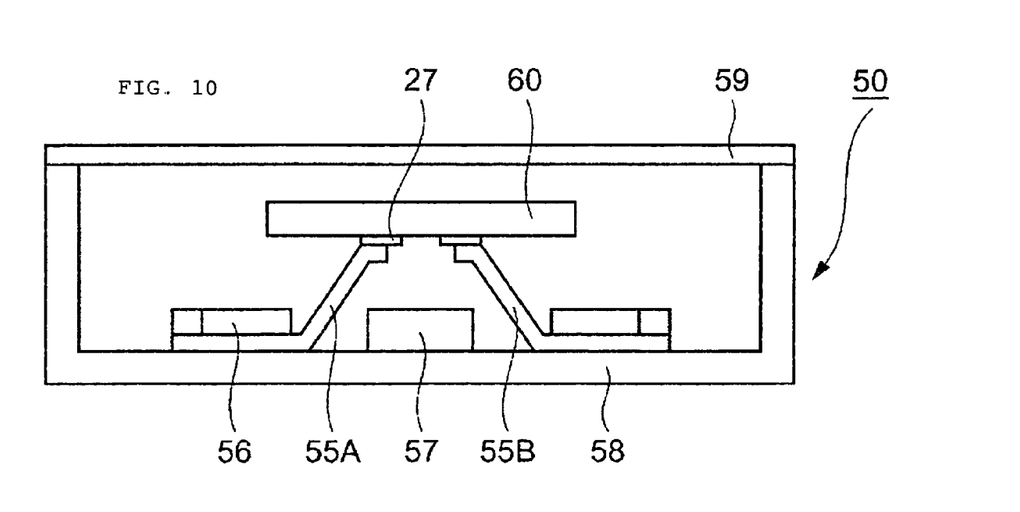
FIG. 10 is a front sectional view showing a configuration of the piezoelectric device of this invention.

At this point, a configuration of a piezoelectric oscillator of this invention will be described. FIG. 10 is a front sectional view showing a configuration of the piezoelectric oscillator of this invention.

According to FIG. 10, the piezoelectric oscillator 50 comprises a piezoelectric resonator element 60, a plurality of lead wires 55A and 55B (in this example, two wires of 55A and 55B will be described) which are a support mechanism to hold the piezoelectric resonator element 60, for example, a ceramic-made package 58 for the piezoelectric resonator element 60 to be placed through the lead wires 55A and 55B, a support substrate 56 to support the lead wires 55A and 55B, a circuit element 57 having a function to oscillate at least the piezoelectric resonator element 60, and a cover 59 for housing members such as the piezoelectric resonator element 60 in the package 58.

Now, the lead wires 55A and 55B are affixed by a support substrate 56 provided in a positional relationship of holding the lead wires 55A and 55B onto the package 58.

At this point, a shape of the lead wires 55A and 55B will be described in detail. The lead wires 55A and 55B are formed such that the piezoelectric resonator element 60 may not be in touch with the package 58 or the circuit element 57 and the like but be positioned inside the package 58. To be specific, after the lead wires 55A and 55B, one ends of which are connected to the package 58, are once bent at a position of the window open part (not illustrated) of the support substrate 57 in the direction from the periphery of the support substrate 56 towards above the center, members including the other ends are further bent so as to be substantially parallel to a bottom surface of the package 58 and the piezoelectric resonator element 60 is connected to the other ends.

According to the piezoelectric oscillator of the above-mentioned configuration, since the lead wire 55A and the like are affixed to the lower surface of the support substrate 56, namely, the surface facing the package 58, it is possible to adhere the lead wire 55A and the like closely to the package 48 without subjecting the lead wire 55A and the like to lead forming.

Further, electronic equipment using the piezoelectric resonator element or the piezoelectric oscillator of this invention will be described.

The piezoelectric resonator element or the piezoelectric oscillator of this invention is used in, for example, electronic equipment such as mobile phones, video cameras, digital cameras, and personal computers, for a control reference signal, a reference signal of clock function, or a sensor and the like.

According to this invention, by using a low-cost piezoelectric device and a piezoelectric oscillator, it is possible to provide low-cost electronic equipment.

As described above, according a piezoelectric device, a manufacturing method of a piezoelectric device, and electronic equipment with a piezoelectric device mounted thereon, since the lead wires are affixed to a lower surface of a support substrate, that is, an opposite surface to a package, it is possible to adhere the lead wires closely to a base substrate without lead forming, thus dispensing with lead forming processing. Namely, it is possible to enhance the ease of processing and to provide a low-cost piezoelectric device.

Also, receiving the Au splash by the support substrate located on the upper surface of the lead wires is made possible, so that it is possible to prevent a short circuit between the lead wires by preventing Au splash from depositing on the lead wires.

The invention claimed is:

1. A piezoelectric device comprising:
   a piezoelectric resonator element;
   a package having a base for supporting said piezoelectric resonator element;
   lead wire(s) having first and second ends with the first end connected to the piezoelectric resonator element for holding the piezoelectric resonator element spaced from the base of a package; and
   a support substrate having a surface on one side facing the piezoelectric resonator element and an undersurface on an opposite side thereof wherein the second end of said lead wire(s) is affixed between the undersurface of the support substrate and the base of the package in a sandwich configuration
   with said undersurface being in an obverse and reverse relationship to said surface of the support substrate facing the resonator element.

2. The piezoelectric device according to claim 1, wherein:
   the lead wire includes a rise up section extending from a periphery of the support substrate
   and being connected to the piezoelectric resonator element at the opposite end thereof.

3. The piezoelectric device according to claim 2, wherein:
   the support substrate and the piezoelectric resonator element are disposed with a gap therebetween.

4. The piezoelectric device according to claim 1, wherein:
   the support substrate and the piezoelectric resonator element are disposed with a gap therebetween.

5. The piezoelectric device according to claim 1 wherein:
   the support substrate is formed of a conductive thin plate and includes an insulating layer, and the lead wire is supported by a surface of the insulating layer.

6. The piezoelectric device according to claim 5, wherein:
   the resonator element is a resonator element for a gyro sensor to detect a rotary angular velocity.

7. The piezoelectric device according to claim 1 further comprising:
   a circuit element for oscillating the resonator element.

8. A piezoelectric device comprising:
   a piezoelectric resonator element; a package having a base for supporting said piezoelectric resonator element; a lead wire having a first and second end with the first end connected to the piezoelectric resonator element for holding the piezoelectric resonator element spaced from the base of a package and having a support substrate spaced from the base of said package in an arrangement for supporting the lead wire, wherein said support substrate includes a surface on one side facing the piezoelectric resonator element and an undersurface on an opposite side thereof which is in an obverse and reverse relationship to the surface facing the resonator element and wherein
   a vicinity of the second end of the lead wire is affixed to the undersurface of the support substrate and wherein said lead wire includes a trailing section extending from a periphery of the support substrate which connects to the piezoelectric resonator element.

9. The piezoelectric device according to claim 8, wherein:
the support substrate has a window open section opposite to the lead wire affixed to the support substrate.

10. The piezoelectric device according to claim 9, wherein:
the support substrate has an opening part extending from the center of the support substrate towards the periphery, and wherein the lead wire has a rise-up section or a trailing section provided in an area of the support substrate in a thickness direction corresponding to the opening part.

11. The piezoelectric device according to claim 8 wherein:
the support substrate is formed of a conductive thin plate and includes an insulating layer, and the lead wire is supported by a surface of the insulating layer.

12. The piezoelectric device according to claim 11, wherein:
the resonator element is a resonator element for a gyro sensor to detect a rotary angular velocity.

* * * * *